B. I. Hazard,
Extracting Turpentine from Trees.
No. 111,743.   Patented Feb. 14, 1871.
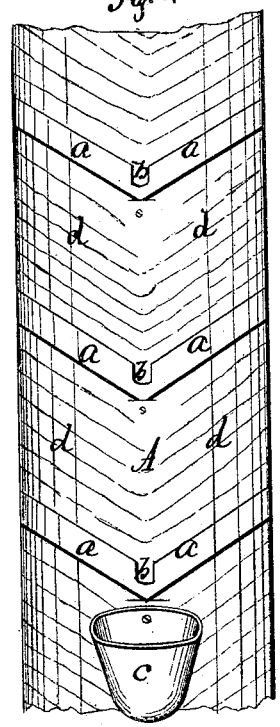
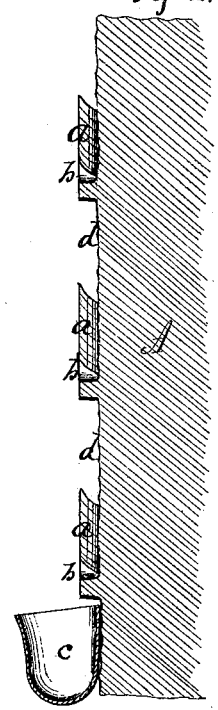
Witnesses
Geo. E. Brown,
C. O. Brown
Inventor
B. I. Hazard

United States Patent Office.

BENJAMIN I. HAZARD, OF GEORGETOWN, SOUTH CAROLINA.

Letters Patent No. 111,743, dated February 14, 1871.

IMPROVEMENT IN EXTRACTING TURPENTINE FROM TREES.

*The Schedule referred to in these Letters Patent and making part of the same.*

I, BENJAMIN I. HAZARD, of Georgetown, District of Georgetown, South Carolina, have invented an Improved Mode of Extracting Turpentine from Trees, of which the following is a specification.

Figure 1 is a front elevation, and
Figure 2 a sectional elevation.

This invention has for its object to make "virgin dip," or the best quality, of all the turpentine that is extracted from a tree; whereas, heretofore it has been found impossible to make virgin dip of more than a portion of the turpentine, owing to the fact that, by the processes in use, that portion of the turpentine produced in the latter part of the first season, and in all seasons subsequent to the first, is exposed too long to the action of the sun and air while flowing from the hacks in the tree to the receptacle.

My invention consists in cutting shallow grooves in the sap-wood of the tree to the depth of an inch and a half, or thereabout, and of a length depending upon the size of the tree, said grooves being V-shaped, and their sides being inclined downward to the radius of the tree so as to hold the turpentine which exudes from the wound, and is conducted by the groove to the point of convergence of its sides, where is made a channel radially of the tree, through which the turpentine trickles and falls into a vessel that is hung under the channel.

Referring to the drawing—

*a a* are the sides of the V-shaped grooves cut in a tree, A.

*b* is the orifice or channel at the point of convergence of the sides *a*.

*c* is the vessel, hung under the orifice *b* in any suitble manner.

Although several of these grooves are shown cut one above another in the tree, yet it should be understood that these are formed at different times, the lowest first, the next to the lowest second, and so on, and only one is used at a time. One V-shaped groove may be enough for a season, or several may be made in the same season, according to circumstances.

The exposed sap-wood above each groove is hacked in lines parallel to the sides of the latter in the usual manner, as shown at *d*, for the purpose of opening the vessels in the tree where the turpentine is stored, and causing it to run down into the V-shaped grooves, said hacks being made at the rate of about one pair a week.

It will be seen that, by this method, turpentine is collected with the least possible exposure to sun and air, having only to run from the hacks to the receiving-vessel.

When the number of hacks above any one of the V-shaped grooves is so great as to subject the turpentine to too much exposure during its flow to the receiver, a new groove is cut, and the vessel *c* moved upward to it. This may be done from month to month, or as often as found necessary.

By this method, also, the deep boxes which it has been customary to cut into the tree to receive the turpentine are dispensed with, to the great benefit of the trees, which, by said boxes, are greatly injured.

I assert that virgin-dip turpentine may be collected from one year's end to another by this process, and also that more turpentine is produced than by any other method.

I claim as my invention—

The method of collecting turpentine by means of V-shaped grooves, *a*, cut in the side of a tree, and channels, *b*, cut in the grooves, as and for the purpose specified.

BENJAMIN I. HAZARD.

Witnesses:
GEO. E. BROWN,
C. O. BROWN.